(12) United States Patent
    Mo

(10) Patent No.: US 11,184,318 B2
(45) Date of Patent: Nov. 23, 2021

(54) 302 REDIRECTING METHOD, URL GENERATING METHOD AND SYSTEM, AND DOMAIN-NAME RESOLVING METHOD AND SYSTEM

(71) Applicant: WANGSU SCIENCE & TECHNOLOGY CO., LTD., Shanghai (CN)

(72) Inventor: Xiaoqi Mo, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/865,095

(22) Filed: May 1, 2020

(65) Prior Publication Data

US 2020/0259781 A1    Aug. 13, 2020

Related U.S. Application Data

(63) Continuation-in-part of application No. 15/529,164, filed as application No. PCT/CN2016/107198 on Nov. 25, 2016, now Pat. No. 10,680,999.

(30) Foreign Application Priority Data

Sep. 19, 2016   (CN) .......................... 201610831336.1

(51) Int. Cl.
    *G06F 15/16*      (2006.01)
    *H04L 29/12*      (2006.01)
    (Continued)

(52) U.S. Cl.
    CPC ...... *H04L 61/1511* (2013.01); *G06F 16/9566* (2019.01); *H04L 61/2007* (2013.01);
    (Continued)

(58) Field of Classification Search
    CPC . H04L 61/103; H04L 61/1511; H04L 61/305; H04L 61/6004; H04L 67/2814
    See application file for complete search history.

(56) References Cited

U.S. PATENT DOCUMENTS 9,111,074 B1 *   8/2015  Friedman ................ G06F 21/41
2002/0035611 A1 *  3/2002  Dooley .................... H04L 61/30
                                                            709/218
(Continued)

FOREIGN PATENT DOCUMENTS

CN    102668518 A    9/2012
CN    103297472 A    9/2013
(Continued)

OTHER PUBLICATIONS

The China National Intelleectual Property Administration (CNIPA) The China Search Report for 201610831336.1, dated Jan. 25, 2019 13 Pages.
(Continued)

*Primary Examiner* — Richard G Keehn (57) ABSTRACT

The present disclosure provides a generating method and a system for redirecting URL, a redirecting server, a resolving method and a system for resolving a domain-name resolution request, a DNS server, a 302 redirecting method that supports HTTPS, and a network system. A client terminal sends a first HTTP request. The redirecting server specifies a content server, convert an IP address of the content server to a prefix of a redirecting domain name, uses a service domain name as a suffix of the redirecting domain name, combines the redirecting domain name and a URL in the first HTTP to form the redirecting URL, and sends the redirecting URL to the client terminal. The client terminal requests for resolving of the redirecting domain name. The DNS server recognizes a domain name in the domain-name resolution request and performs an inverse converting on the prefix of (Continued)

the redirecting domain name to obtain an IP address of the content server and sends the IP address of the content server to the client terminal. The client terminal sends a second HTTP request containing the redirecting URL to the content server; and sends an IP generated by resolving and in correspondence of the first HTTP request to the client terminal.

16 Claims, 3 Drawing Sheets

(51) Int. Cl.
  *H04L 29/06* (2006.01)
  *H04L 29/08* (2006.01)
  *G06F 16/955* (2019.01)
(52) U.S. Cl.
  CPC .......... *H04L 61/301* (2013.01); *H04L 61/304* (2013.01); *H04L 63/0272* (2013.01); *H04L 63/168* (2013.01); *H04L 67/02* (2013.01); *H04L 67/2814* (2013.01); *H04L 67/40* (2013.01)

(56) References Cited

U.S. PATENT DOCUMENTS

| | | | | |
|---|---|---|---|---|
| 2006/0020684 A1* | 1/2006 | Mukherjee | .......... | H04L 67/2804 709/219 |
| 2007/0250560 A1* | 10/2007 | Wein | .................. | H04L 67/1008 709/201 |
| 2010/0042681 A1* | 2/2010 | Jeon | .................. | H04L 29/12066 709/203 |
| 2011/0026435 A1* | 2/2011 | Weniger | .............. | H04L 61/2007 370/254 |
| 2012/0290724 A1 | 11/2012 | Raffaele et al. | | |
| 2013/0301651 A1* | 11/2013 | Haddad | .................. | H04L 67/14 370/467 |
| 2015/0222604 A1* | 8/2015 | Ylonen | .................. | G06F 21/575 713/171 |
| 2016/0182441 A1* | 6/2016 | Gupta | .................. | H04L 61/3025 709/245 |
| 2016/0316006 A1* | 10/2016 | Zhang | .................... | H04L 61/304 |
| 2016/0373445 A1* | 12/2016 | Hayton | .................. | G06F 21/554 |
| 2017/0289107 A1* | 10/2017 | Plichta | .................. | H04L 63/083 |
| 2018/0107503 A1* | 4/2018 | Machida | ............. | G06F 9/45558 |
| 2018/0337830 A1* | 11/2018 | Padhye | .................. | H04L 41/12 |

FOREIGN PATENT DOCUMENTS

| | | |
|---|---|---|
| CN | 103491112 A | 1/2014 |
| CN | 104125258 A | 10/2014 |
| CN | 104320487 A | 1/2015 |
| CN | 104427499 A | 3/2015 |
| CN | 105338128 A | 2/2016 |
| CN | 105934930 A | 9/2016 |
| WO | 2012097030 A1 | 7/2012 |
| WO | 2016127914 A1 | 8/2016 |

OTHER PUBLICATIONS

The China National Intelleectual Property Administration (CNIPA) The China Search Report for 201610831336.1, dated Sep. 30, 2019 19 Pages.
Yongjie Wang et al,Principle and Performance Analysis of Covert Tunnel Based on DNS Protocol, Computer Engineering, Jul. 31, 2017,vol. 40 No.7,Section 3.2 of the text 102-105 Pages.
The World Intellectual Property Office (WIPO) International Search Report for PCT/CN2016/107198 dated Jun. 8, 2017 5 Pages.
The European Patent Office (EPO) The extended European search report for 16884246.6, dated Feb. 19, 2018 7 Pages.

* cited by examiner

302 REDIRECTING METHOD, URL GENERATING METHOD AND SYSTEM, AND DOMAIN-NAME RESOLVING METHOD AND SYSTEM

CROSS-REFERENCES TO RELATED APPLICATIONS

This patent application is a continuation-in-part of and claims priority to U.S. application Ser. No. 15/529,164, which is a national phase entry under 35 U.S.C. § 371 of PCT Application No. PCT/CN2016/107198 filed on Nov. 25, 2016, which claims priority of Chinese patent application No. 201610831336.1, filed on Sep. 19, 2016, the entire contents of all of which are incorporated herein by reference.

FIELD OF THE DISCLOSURE

The present disclosure relates to a 302 redirecting field and, particularly, to a uniform resource locator (URL) generating method and system, a domain-name resolving method and system, a 302 redirecting method and network system that support hypertext transfer protocol secure (HTTPS).

BACKGROUND

In content delivery network (CDN) systems, the hypertext transfer protocol (HTTP) 302 redirecting method is widely used. One scenario is that, when a server being accessed does not store the desired file, the server can redirect the access directly to the server that stores the file based on known data. Another scenario is that, there exists a 302 redirecting method of which the streaming media load balancing system is HTTP protocol (HTTP Load Balance, referred to as: HLB). This kind of load balancing system based on HTTP directing has many outstanding advantages compared to the domain name system (DNS)-based traffic load system, such as being highly real-time and accurate, and having content perception.

The HTTPS protocol is a secure extension of the HTTP protocol, providing server authentication and protecting the privacy and integrity of data. Based on security considerations, more and more websites began to use the HTTPS protocol to show their content. However, HTTPS protocol does not intrinsically support a 302 redirecting method, in HTTP protocol, that uses an Internet protocol (IP) as the destination. Because, after the 302 redirecting, the carried IP can be used as a host, causing the client terminal in the secure socket layer (SSL) handshake stage to take the IP as a domain name to verify the legitimacy of the certificate, rather than using the domain name (provided by the certificate on the server) before the redirecting for verification. This will lead to certificate verification failure.

One of the existing ways to support HTTPS redirecting is to add the name or ID (identification) of the server, to which is to be redirected, into the domain name. For example, when the client terminal is expected to access the server having the ID of xyz, a 302 redirecting URL to the domain name of xyz.chinanetcenter may be returned. When the client terminal resolves xyz.chinanetcenter.com, the server obtains the IP address of xyz based on internal storage and returns it to the client terminal. However, this method still has shortcomings. That is, the redirecting method is not easy to expand. When servers change, the DNS server must timely update the IP list of the servers, otherwise, the domain-name resolution requests may not be resolved or the resolving may be wrong.

In general, when a CDN client needs to use HTTPS for an entire website, the 302 redirecting technology, using an IP as the destination, cannot directly support the action of the CND client.

BRIEF SUMMARY OF THE DISCLOSURE

In view of the shortcomings of the conventional technology, the goal of the present disclosure includes using the disclosed generating method and system for redirecting URL, the resolving method and system for domain-name resolution request, the 302 redirecting method, and the network system to solve the aforementioned problems in the conventional technology.

To realize the aforementioned goal and other relevant goals, the present disclosure provides a redirecting URL (uniform resource locator) generating method, applied on a redirecting server connected to a client terminal through a communication link, including: receiving a first HTTP (hypertext transfer protocol) request sent from the client terminal; and specifying a content server, converting an IP (Internet protocol) address of the content server to a prefix of a redirecting domain name according to predetermined rules, using a pre-registered domain name as a suffix of the redirecting domain name, combining the redirecting domain name and a URL in the first HTTP to form the redirecting URL, and sending the redirecting URL to the client terminal.

In one embodiment, the predetermined rules include a Base32 algorithm.

In one embodiment, the prefix of the redirecting domain name further includes content converted from a domain name in the first HTTP request according to the predetermined rules.

To realize the aforementioned goal and other relevant goals, the present disclosure provides a resolving method for resolving a domain-name resolution request, applied on a domain name system (DNS) server connected to a client terminal through a communication link, for resolving the redirecting domain name, including: receiving a domain-name resolution request, for resolving the redirecting domain name, sent from the client terminal; and in response to recognizing the pre-registered domain name in the domain-name resolution request, converting the prefix of the redirecting domain name based on an inverse operation of the predetermined rules to obtain an IP address of the content server, and sending the IP address of the content server to the client terminal.

In one embodiment, the predetermined rules include a Base 32 algorithm.

In one embodiment, converting the prefix of the redirecting domain name based on an inverse operation of the predetermined rules further includes obtaining a domain name in the first HTTP request.

To realize the aforementioned goal and other relevant goals, the present disclosure provides a 302 redirecting method that supports HTTPS (hypertext transfer protocol secure), applied on a network formed by a redirecting server, a DNS (domain name system) server and a content server which are respectively connected to a client terminal through a communication link, the method including: sending, by the client terminal, a first HTTP (hypertext transfer protocol) request to the redirecting server; receiving, by the redirecting server, the first HTTP request; specifying, by the redirecting server, a content server, to convert an IP address of the content server to a prefix of a redirecting domain name according to predetermined rules; using, by the redirecting server, a pre-registered domain name as a suffix of the redirecting domain name; combining, by the redirecting server, the redirecting domain name and a URL (uniform resource locator) in the first HTTP to form the redirecting URL; and sending, by the redirecting server, the redirecting URL to the client terminal; receiving, by the client terminal, the redirecting URL, and sending, by the client terminal, a domain-name resolution request for resolving the redirecting domain name in the first HTTP request to the DNS server; receiving, by the DNS server, the domain-name resolution request; in response to recognizing the pre-registered domain name in the domain-name resolution request, inversely converting, by the DNS server, the prefix of the redirecting domain name based on the predetermined rules to obtain an IP address of the content server; and sending, by the DNS server, the IP address of the content server to the client terminal; receiving, by the client terminal, the IP address of the content server, and sending, by the client terminal, a second HTTP request containing the directing URL, to the client terminal; and receiving, by the content server, the second HTTP request, and sending, by the content server, an HTTP response, generated accordingly, to the client terminal.

To realize the aforementioned goal and other relevant goals, the present disclosure provides a URL (uniform resource locator) generating system, applied on a redirecting server connected to a client terminal through a communication link, including: a request receiving module, for receiving a first HTTP request sent from the client terminal; and a URL generating module, for specifying a content server, converting an IP address of the content server to a prefix of a redirecting domain name according to predetermined rules, using a pre-registered domain name as a suffix of the redirecting domain name, combining the redirecting domain name and a URL in the first HTTP to form the redirecting URL, and sending the redirecting URL to the client terminal.

To realize the aforementioned goal and other relevant goals, the present disclosure provides a domain-name resolving system for resolving a domain-name resolution request, applied on a DNS server connected to a client terminal through a communication link, for resolving any one of the aforementioned redirecting domain names, including: a request receiving module, for receiving a domain-name resolution request for resolving the redirecting domain name sent from the client terminal; and a request resolving module, in response to recognizing the pre-registered domain name in the domain-name resolution request, converting a prefix of the redirecting domain name based on an inverse operation of the predetermined rules to obtain an IP address of the content server, and sending the IP address of the content server to the client terminal.

To realize the aforementioned goal and other relevant goals, the present disclosure provides a network system, including: a redirecting server, a DNS server, and a content server, respectively connected to a client terminal through a communication link, wherein the redirecting server includes the aforementioned URL generating method, and the DNS server includes the aforementioned domain-name resolving system for domain name resolution request.

Thus, the disclosed 302 redirecting method, the URL generating method and system, and domain-name resolving method and system, solve the issue of 302 redirecting technology cannot be directly used in a conventional CDN system when the entire website uses HTTPS, and scalability can be effectively increased.

DETAILED DESCRIPTION

Various advantages and effects of the present disclosure will be readily apparent to those skilled in the art from the disclosure of the specification by way of specific embodiments thereof. The present disclosure may also be further embodied or applied with different embodiments, and the details in this specification may be modified or varied without departing from the spirit of the disclosure, on the basis of different views and applications. It is to be noted that, without conflict, the features of the following embodiments and examples may be combined with one another.

It should be noted that the illustrations provided in the following embodiments illustrate only the basic concept of the present disclosure in a schematic manner, and only the components related to the present disclosure are shown in the drawings, rather than the number, shape and size of the actual implementations of the components. In practice, the shape, quantity, and proportions of each component can be flexibly changed, and the arrangement and status of the components may also be more complex.

In view of the features of the current HTTPS, the present disclosure provides a redirecting method which is based on a special domain name generated from the IP to replace the IP. The main problem solved by the present disclosure includes (1) HTTPS not intrinsically supporting 302 redirecting that uses an IP as the destination; (2) poor scalability of many technologies in the conventional CDN systems that rely on the HTTP 302 redirecting, and of many technologies that directly use an IP as the destination.

Figure 1:
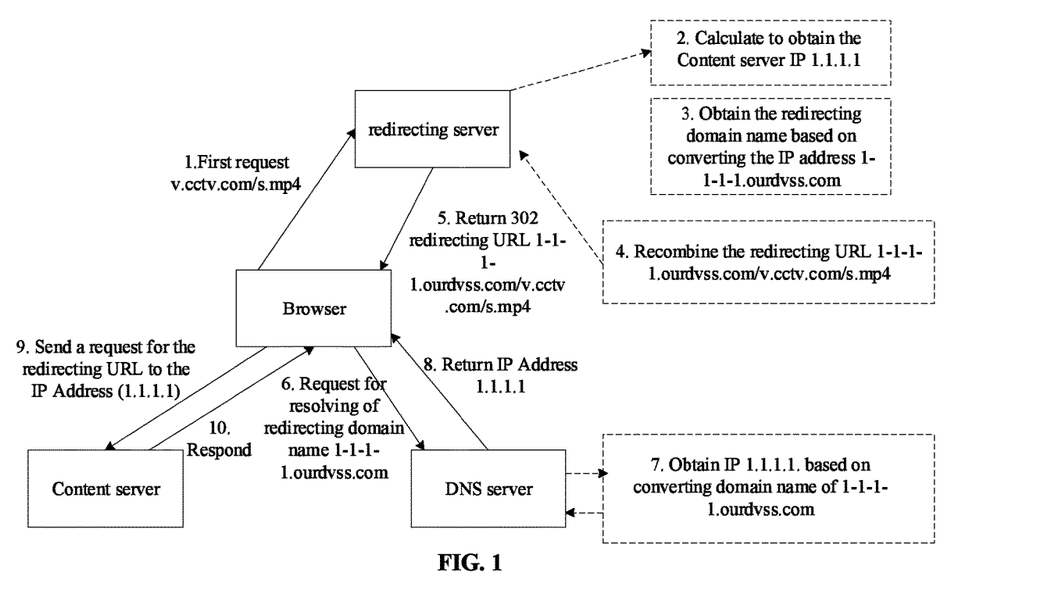
FIG. 1 illustrates an exemplary of 302 redirecting method consistent with the disclosed embodiments of the present disclosure.

As shown in FIG. 1, the present disclosure provides a network system, including a redirecting server, a DNS server, and a content server. Each described server is independent of each other with specified functions as described elsewhere here, and is connected with the client terminal through a communication link. It should be noted that, the specifying method of the three servers is not the key point discussed in the present disclosure, those skilled in the art may specify a server according to existing technology, for example, may specify a server according to the principles such as a closest service distance principle, or service network operator, which are not repeated herein.

On this basis, the present disclosure provides a 302 redirecting method that supports HTTPS. The disclosed method can be applied in the network system shown in FIG.

1. The implementation of the disclosed method is now illustrated in view of the specific embodiments shown in FIG. 1.

1. The client terminal, e.g., a browser, may send a first HTTP request to a redirecting server, e.g., "v.cctv.com/s.mp4". Here, the domain name included in the first HTTP request is "v.cctv.com", and the uri is merely "/s.mp4". However, it should be noted that, in some embodiments, the domain name is also included in uri when generating a redirecting URL, as further described below.

2. The redirecting server may receive the first HTTP request, and may specify a content server, based on principles such as a closest service distance principle. For example, the IP address of the specified content server may be "1.1.1.1".

3. The redirecting server may convert the IP address of the content server to the prefix of the redirecting domain name, according to predetermined rules, e.g., a Base32 algorithm. For example, the Base32 algorithm may be used to convert "1.1.1.1" to a prefix "GEXDCLRRFYYQ" (replaced by "1-1-1-1" in the follows). It should be noted that, according to the Base32 algorithm, the actual string obtained may be "GEXDCLRRFYYQ====". However, because "=" is not allowed in domain names, "=" needs to be removed.

Further, it should be noted that, in the prefix, besides the string converted from the IP address of the content server, the prefix may also include other contents. For example, the prefix may include the content converted from the domain name contained in the first HTTP request, based on the predetermined rules, i.e., "v-cctv-com" converted from "v.cctv.com" (as an example). The corresponding prefix may be "1-1-1-1-cctv-com". Further, a pre-registered service domain name may be used as the suffix of the redirecting domain name. For example, the pre-registered service domain name may be "ourdvss.com". Thus, the obtained redirecting domain name may be "1-1-1-1-v-cctv-com.ourdvss.com".

In some embodiments, the redirecting domain name may not include the domain name included in the first HTTP request. Instead, the domain name included in the first HTTP request is included in uri when a redirecting URL is generated. Accordingly, the obtained redirecting domain name may be "1-1-1-1.ourdvss.com" without the domain name included in the first HTTP request.

From the above, it can be seen that the redirecting domain name may be a domain name (e.g., 1-1-1-1-v-cctv-com.ourdvss.com) that includes a portion relating to the original domain name (or subdomain or same-level domain name, etc.) included in the original request. Additionally or alternatively, the redirecting domain name may be a domain name (e.g., 1-1-1-1.ourdvss.com) that is agnostic of the original domain name included in the original request. For a redirecting domain name that is agnostic of the original domain name included in the original request, the redirecting domain name may be considered as a CDN-specific domain name. For instance, for the original domain name v.cctv.com, the redirecting domain name may be xxx.ourdvss.com, where ourdvss.com is a pre-registered domain name that is CDN-specific, and is independent of the original domain name v.cctv.com included in the request. In this way, the generated redirecting domain name is agnostic of the client terminal. Therefore, there is no need to make any special change for the generated CDN-specific domain name in response to the request from the client terminal. Further, if implemented in this way, the certificate is then controlled by the corresponding CDN. Since the CDN-specific domain name is agnostic of the client terminal, in some embodiments, when another different domain name from another client request needs to be redirected, the same CDN-specific domain name may be also used for that different domain name from another client request.

4. The redirecting server may combine the redirecting domain name and the URL contained in the first HTTP request to form a redirecting URL. For example, "1-1-1-1.ourdvss.com" and "v.cctv.com/s.mp4" may be combined to form "1-1-1-1.ourdvss.com/v.cctv.com/s.mp4". Alternatively, "1-1-1-1-v-cctv-com.ourdvss.com" may be combined with "v.cctv.com/s.mp4" to form "1-1-1-1-v-cctv-com.ourdvss.com/v.cctv.com/s.mp4" or combined with "/s.mp4" to form "1-1-1-1-v-cctv-com.ourdvss.com/s.mp4".

5. The redirecting server may send the redirecting URL to the client terminal. For example, the redirecting server may send "1-1-1-1.ourdvss.com/v.cctv.com/s.mp4", "1-1-1-1-v-cctv-com.ourdvss.com/v.cctv.com/s.mp4", or "1-1-1-1-v-cctv-com.ourdvss.com/s.mp4" to the client terminal.

6. The client terminal may receive the redirecting URL, and send the redirecting domain name contained in the redirecting URL to a DNS server. For example, the client terminal may send a resolution request for "1-1-1-1.ourdvss.com" or "1-1-1-1-v-cctv-com.ourdvss.com" to the DNS server.

7. The DNS server may receive the domain-name resolution request. When the DNS server recognizes the pre-registered domain name in the domain-name resolution request, the DNS server may convert the prefix of the redirecting domain name according to an inverse algorithm of the predetermined rules, to obtain the IP address of the content server. There is no need for data synchronization. In some embodiments, if an identification (ID) of the content server is used, a correspondence between the ID and the IP of the content server then needs to be synchronized between the redirecting server and the DNS server, to achieve the above-described implementations.

For example, for the resolution request for "1-1-1-1.ourdvss.com", the DNS server may detect "ourdvss.com", and may invert "1-1-1-1" to "1.1.1.1" according to the inverse algorithm of Base32. It should be noted that, before converting the prefix of the redirecting domain name, the DNS server may complete the symbols that have been removed according to predetermined rules. For example, for the string "GEXDCLRRFYYQ" represented by "1-1-1-1", the DNS server may, according to a Base32 algorithm, complete the string to be "GEXDCLRRFYYQ====". Further, based on the inverse algorithm of Base32, the DNS server may convert the "GEXDCLRRFYYQ====". In addition, it should be noted that, when the prefix includes other contents, the DNS server may also restore the contents based on the inverse algorithm of the predetermined rules. For example, for the resolution request for "1-1-1-1-v-cctv-com.ourdvss.com", the prefix may further include the content (e.g., v-cctv-com) converted from the domain name contained in the first HTTP request, based on the predetermined rules. Accordingly, when detecting the pre-registered domain name, the DNS server may restore the domain name in the first HTTP request for subsequent uses such as counting and other purposes. For example, "v-cctv-com" may be restored to "v.cctv.com".

8. The DNS server may send the restored IP address of the content server to the client terminal. For example, the DNS server may send "1.1.1.1" as an A-record to the client terminal.

9. The client terminal may receive the IP address of the content server, and may send a second HTTP request to the content server, where the second HTTP request includes the redirecting URL. For example, the client terminal may send the second HTTP request, containing "1-1-1-1.ourdvss.com/v.cctv.com/s.mp4", "1-1-1-1-v-cctv-com.ourdvss.com/v.cctv.com/s. mp4", or "1-1-1-1-v-cctv-com.ourdvss.com/s.mp4" to the content server.

10. The content server may receive the second HTTP request, restore the original domain name (e.g., v.cctv.com) from the second HTTP request, and proceed correspondingly. For instance, the content server may send the corresponding HTTP response to the client terminal, the HTTP response containing the content desired by the client terminal such as video files, etc. It should be noted that, the content server may be bound with a service specific suffix, that is, the SSL certificate of a pre-registered service domain name, to provide response service for the client terminal.

Figure 2:
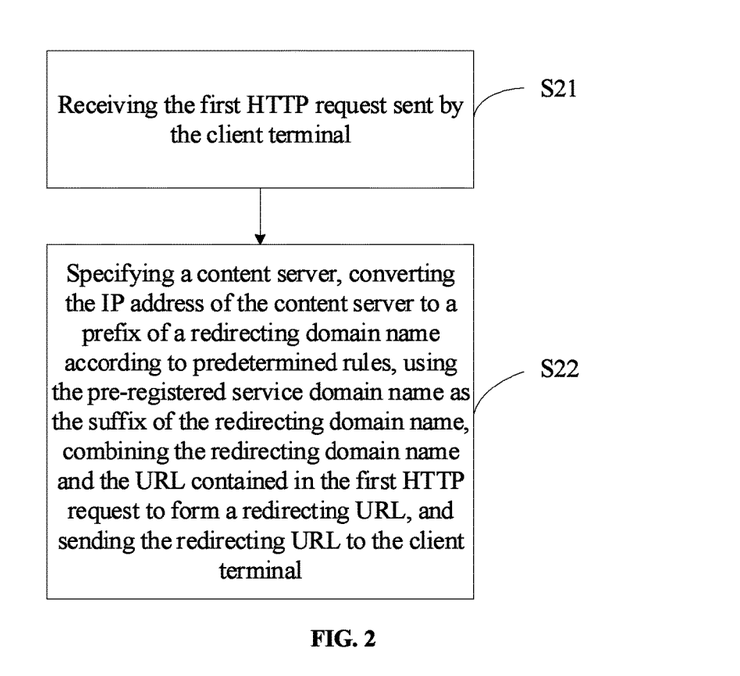
FIG. 2 illustrates an exemplary method to generate a redirecting URL consistent with the disclosed embodiments of the present disclosure.

As shown in FIG. 2, similar to the aforementioned working principles of the 302 redirecting method that supports HTTPS, the present disclosure provides a method for generating a redirecting URL. The method may be applied on the redirecting server connected with the client terminal, through a communication link. Preferably, the method may be applied to the redirecting server in the network system shown in FIG. 1. The method comprises the following steps:

In step S21, the first HTTP request sent from the client terminal may be received.

In step S22, a content server may be specified. The IP address of the content server may be converted to a prefix of a redirecting domain name according to predetermined rules (e.g., Base32 algorithm), the pre-registered service domain name may be used as the suffix of the redirecting domain name, the redirecting domain name and the URL contained in the first HTTP request may be combined to form a redirecting URL, and the redirecting URL may be sent to the client terminal.

Figure 3:
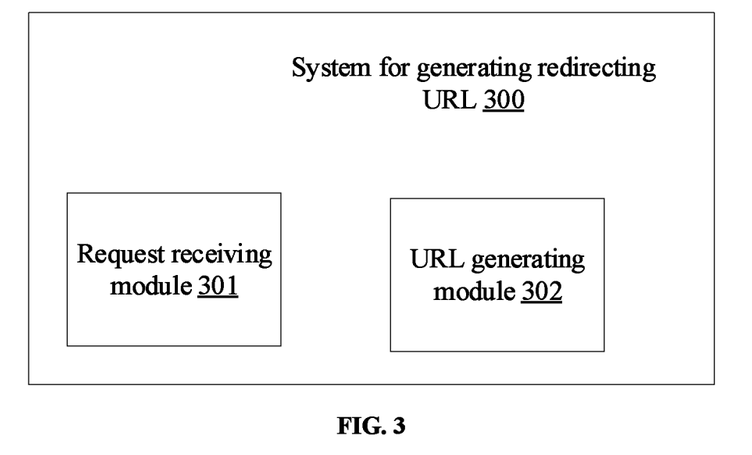
FIG. 3 illustrates an exemplary system to generate a redirecting URL consistent with the disclosed embodiments of the present disclosure.

As shown in FIG. 3, similar to the working principles illustrated in FIG. 2, the present disclosure further provides a system 300 for generating a redirecting URL, applied on a redirecting server. The disclosed system may include a request receiving module 301 and a URL generating module 302.

The request receiving module 301 may receive a first HTTP request sent from the client terminal. The URL generating module 302 may specify a content server, convert the IP address of the content server to a prefix of a redirecting domain name according to predetermined rules, use the pre-registered service domain name as the suffix of the redirecting domain name, combine the redirecting domain name and the URL in the first HTTP request to form a redirecting URL, and send the redirecting URL to the client terminal. In one embodiment, the URL generating module 302 may convert the domain names in the first HTTP request according to predetermined rules and add the converted first HTTP request into the prefix.

Figure 4:
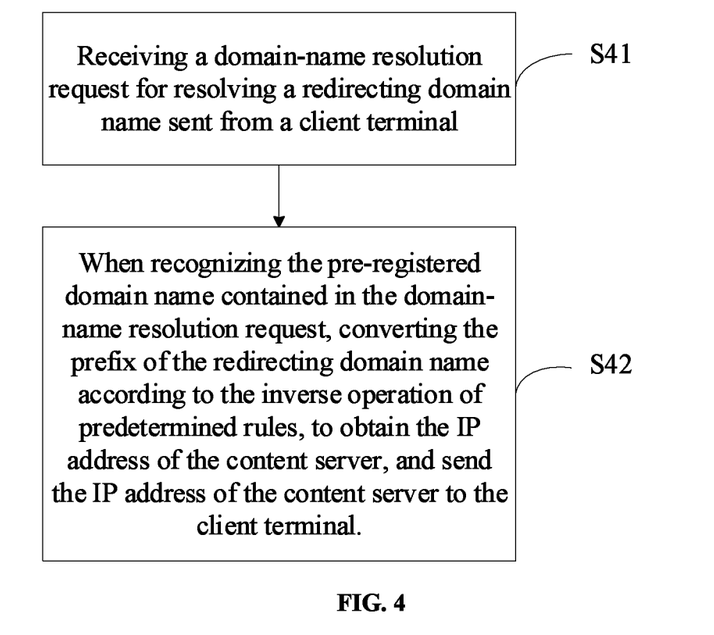
FIG. 4 illustrates an exemplary resolving method for a redirecting-domain-name resolution request consistent with the disclosed embodiments of the present disclosure.

As shown in FIG. 4, similar to the working principles of the aforementioned 302 redirecting method that supports HTTPS, the present disclosure provides a resolving method for a redirecting-domain-name resolution request, applied on the DNS server connected with the client terminal, through a communication link. Preferably, the disclosed resolving method may be applied to the DNS server in the network system shown in FIG. 1. The disclosed resolving method may include the follows.

In step S41, a domain-name resolution request for resolving a redirecting domain name, sent from a client terminal, may be received.

In step S42, when the pre-registered domain name contained in the domain-name resolution request is recognized, the prefix of the redirecting domain name may be converted according to the inverse operation (e.g., inverse Base32 algorithm) of predetermined rules (e.g., Base32 algorithm), to obtain the IP address of the content server and send the IP address of the content server to the client terminal. In one embodiment, step S42 may further include restoring the prefix to obtain the corresponding domain name included in the first HTTP request and storing the domain name.

Figure 5:
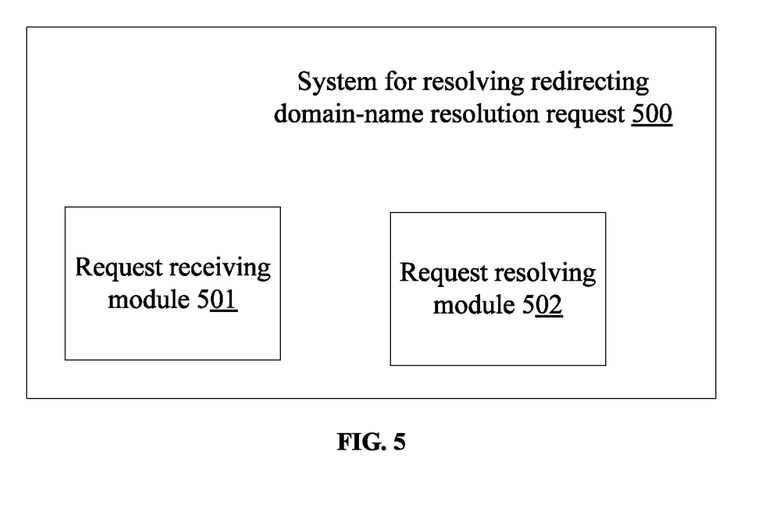
FIG. 5 illustrates an exemplary system for resolving a redirecting-domain-name resolution request consistent with the disclosed embodiments of the present disclosure.

As shown in FIG. 5, similar to the working principles illustrated in FIG. 4, the present disclosure further provides a system 500 for resolving a redirecting-domain-name resolution request, applied on the DNS server. The disclosed system 500 may include a request receiving module 501 and a request resolving module 502.

The request receiving module 501 may receive a domain-name resolution request for resolving a redirecting domain name sent from a client terminal. When the request resolving module 502 recognizes the pre-registered domain name in the domain-name resolution request, the request resolving module 502 may convert the prefix of the redirecting domain name according to the inverse operation of predetermined rules, to obtain the IP address of the content server and send the IP address of the content server to the client terminal.

It should be noted that the present disclosure is applied to a redirecting method based on the application layer protocol, but not a method based on DNS resolution. In the existing CDN filed, the redirecting methods may include two different methods: based on DNS resolution or based on application layer protocol. When based on the DNS resolution, the redirecting strategy is deployed in the DNS system, and the IP information of a client-accessible server is returned to a client terminal through polling mechanism or the like. However, when based on the application layer protocol, taking the HTTP protocol as an example, the redirecting is implemented by using the protocol's own function, which is totally different from the DNS resolution-based redirecting method.

It should be further noted, among the application layer protocol-based redirecting methods, the present disclosure is specifically focused on the HTTPS redirecting method. HTTPS is an HTTP channel with an emphasis on security. On the basis of HTTP, HTTPS ensures the security of the transmission process through transmission encryption and identity authentication. For instance, in many browsers, the HTTP protocol without secure encryption and the HTTPS protocol with secure encryption can be directly identified. Beginning around 2015, Google®, Baidu®, e-commerce Alibaba®, etc., gradually turned to support secure HTTPS in their sites. The CDN industry, which provides network acceleration services, has followed the trend and launched redirecting technology solutions suitable for HTTPS security policies. The redirecting technology solutions suitable for HTTPS are different from those for HTTP. For instance, for HTTP-based redirecting methods, there are some restrictions in the application scenarios that need to use cookie information to authenticate terminal users or record access history. Therefore, it is necessary to solve the problem of how to carry cookie information in the access requests. However, such problem is not the focus of an HTTPS-based redirecting method. Instead, the present disclosure aims to solve a problem when the application layer protocol is extended from HTTP to HTTPS, i.e., the problem that the CDN system does not support writing the server's IP address to the redirected 302 redirect URL, as discussed earlier.

The present disclosure provides a network system, including a content server, a redirecting server comprising system 300, and a DNS server comprising system 500. The three types of servers may be connected with the client terminal through a communication link. The aforementioned technical features of the servers may be applied to the present embodiment, so that the technical features of the disclosed network system are not repeated herein.

Thus, the disclosed 302 redirecting method, the URL generating method and system, and the domain-name resolving method and system, may solve the problem of not being able to directly use the 302 redirecting technique in a conventional CDN system when the entire website uses HTTPS. Scalability may be effectively improved. The shortcomings in conventional technology may be effectively overcome and the disclosed methods and systems have high industrial value.

The aforementioned embodiments merely illustrate the principles and effects of the present disclosure and are not intended to limit the disclosure. Any person skilled in the art will be able to modify or alter the aforementioned embodiments without departing from the spirit and scope of the disclosure. Accordingly, all equivalents or modifications that may be made by those skilled in the art without departing from the spirit and technical concept disclosed in the present disclosure are intended to be encompassed by the claims of the present disclosure.

What is claimed is:

1. A method for resolving a domain-name resolution request in a network system, comprising:
sending, by a client terminal, a first HTTP (hypertext transfer protocol) request to a redirecting server for a requested content;
receiving, by the redirecting server, the first HTTP request sent from the client terminal; and
specifying, by the redirecting server, a content server, and converting, by the redirecting server, an IP (Internet protocol) address of the content server to a prefix of a redirecting domain name according to predetermined rules, wherein the prefix of the redirecting domain name excludes content converted from a domain name in the first HTTP request.

2. The method according to claim 1, further comprising:
using, by the redirecting server, a pre-registered domain name as a suffix of the redirecting domain name;
combining, by the redirecting server, the redirecting domain name including the prefix and the suffix with a URL (uniform resource locator) in the first HTTP request to form a redirecting URL; and
sending, by the redirecting server, the redirecting URL to the client terminal.

3. The method according to claim 2, further comprising:
receiving, by the client terminal, the redirecting URL, and sending, a domain-name resolution request to resolve the redirecting domain name, contained in the redirecting URL, to a DNS (domain name system) server;
receiving, by the DNS server, the domain-name resolution request; and
in response to recognizing the pre-registered domain name in the domain-name resolution request, converting, by the DNS server, the prefix of the redirecting domain name based on an inverse operation of the predetermined rules to obtain the IP address of the content server, and sending, by the DNS server, the IP address of the content server to the client terminal.

4. The method according to claim 3, further comprising:
receiving, by the client terminal, the IP address of the content server; and sending, by the client terminal, a second HTTP request to the content server, the second HTTP request containing the redirecting URL.

5. The method according to claim 4, further comprising:
receiving, by the content server, the second HTTP request; and
sending, by the content server, a response to the second HTTP request to the client terminal, the response to the second HTTP request containing the requested content.

6. The method according to claim 3, wherein converting the prefix of the redirecting domain name based on the inverse operation of the predetermined rules further includes obtaining a domain name in the first HTTP request.

7. The method according to claim 2, wherein a domain name in the first HTTP request is excluded from the URL in the first HTTP request when forming the redirecting URL.

8. The method according to claim 2, wherein a domain name in the first HTTP request is maintained in the URL in the first HTTP request when forming the redirecting URL.

9. The method according to claim 2, wherein the pre-registered domain name is a content delivery network (CDN)-specific domain name.

10. The method according to claim 1, wherein the predetermined rules include a Base32 algorithm.

11. A 302 redirecting method that supports hypertext transfer protocol secure (HTTPS), comprising:
sending, by a client terminal, a first HTTP (hypertext transfer protocol) request to the redirecting server;
receiving, by a redirecting server, the first HTTP request; specifying, by the redirecting server, a content server, and converting an IP address of the content server to a prefix of a redirecting domain name according to predetermined rules; using, by the redirecting server, a pre-registered domain name as a suffix of the redirecting domain name; combining, by the redirecting server, the redirecting domain name and a URL (uniform resource locator) in the first HTTP request to form a redirecting URL; and sending, by the redirecting server, the redirecting URL to the client terminal;
receiving, by the client terminal, the redirecting URL, and sending, by the client terminal, a domain-name resolution request for resolving the redirecting domain name contained in the redirecting URL to a DNS server;
receiving, by the DNS server, the domain-name resolution request; in response to recognizing the pre-registered domain name in the domain-name resolution request, inversely converting, by the DNS server, the prefix of the redirecting domain name based on the predetermined rules to obtain the IP address of the content server; and sending, by the DNS server, the IP address of the content server to the client terminal;
receiving, by the client terminal, the IP address of the content server, and sending, by the client terminal, a second HTTP request containing the redirecting URL, to the content server; and
receiving, by the content server, the second HTTP request, and sending by the content server, an HTTP response, generated accordingly, to the client terminal.

12. A network system, comprising a redirecting server that is configured for:
receiving a first HTTP request sent from a client terminal; and
specifying a content server, and converting an IP (Internet protocol) address of the content server to a prefix of a redirecting domain name according to predetermined rules, wherein the prefix of the redirecting domain name excludes content converted from a domain name in the first HTTP request.

13. The network system according to claim 12, wherein the redirecting server is further configured for:
   using a pre-registered domain name as a suffix of the redirecting domain name;
   combining the redirecting domain name including the prefix and the suffix with a URL in the first HTTP request to form a redirecting URL; and
   sending the redirecting URL to the client terminal.

14. The network system according to claim 12, the redirecting server is further configured for:
   receiving a domain-name resolution request for resolving the redirecting domain name sent from the client terminal; and
   in response to recognizing the pre-registered domain name in the domain-name resolution request, converting the prefix of the redirecting domain name based on an inverse operation of the predetermined rules to obtain an IP address of the content server, and sending the IP address of the content server to the client terminal.

15. The network system according to claim 12, wherein a domain name in the first HTTP request is excluded from the URL in the first HTTP request when forming the redirecting URL.

16. The network system according to claim 12, wherein a domain name in the first HTTP request is maintained in the URL in the first HTTP request when forming the redirecting URL.

* * * * *